US011980317B2

(12) United States Patent
Louie et al.

(10) Patent No.: US 11,980,317 B2
(45) Date of Patent: May 14, 2024

(54) BEVERAGE DISPENSER WITH AN IDENTIFICATION DEVICE AND AN OPERATING METHOD THEREOF

(71) Applicant: SANDORA HOUSEHOLD ELECTRIC APPLIANCES (SHENZHEN) LTD., Shenzhen (CN)

(72) Inventors: Waihang Louie, Shenzhen (CN); Changhai Yu, Shenzhen (CN); Marko Unger, Shenzhen (CN); Kwokwai Wong, Shenzhen (CN)

(73) Assignee: SANDORA HOUSEHOLD ELECTRIC APPLIANCES (SHENZHEN) LTD., Shenzhen (CN)

( * ) Notice: Subject to any disclaimer, the term of this patent is extended or adjusted under 35 U.S.C. 154(b) by 700 days.

(21) Appl. No.: 17/267,443

(22) PCT Filed: Dec. 18, 2020

(86) PCT No.: PCT/CN2020/137759
§ 371 (c)(1),
(2) Date: Feb. 9, 2021

(87) PCT Pub. No.: WO2022/032954
PCT Pub. Date: Feb. 17, 2022

(65) Prior Publication Data
US 2022/0304500 A1     Sep. 29, 2022

(30) Foreign Application Priority Data

Aug. 13, 2020  (CN) .......................... 202010830467.4

(51) Int. Cl.
*A47J 31/52*   (2006.01)
*A47J 31/057*  (2006.01)
*A47J 31/50*   (2006.01)

(52) U.S. Cl.
CPC ............. *A47J 31/52* (2013.01); *A47J 31/057* (2013.01); *A47J 31/525* (2018.08); *A47J 31/505* (2013.01)

(58) Field of Classification Search
CPC .... A47J 31/002; A47J 31/057; A47J 31/4492; A47J 31/505; A47J 31/52; A47J 31/525
(Continued)

(56) References Cited

U.S. PATENT DOCUMENTS 5,094,153 A * 3/1992 Helbling ................. A47J 31/52
                                                99/291
6,380,521 B1 * 4/2002 Fanzutti .............. A47J 31/4439
                                                219/481
(Continued)

FOREIGN PATENT DOCUMENTS

CN   205514129 U   8/2016
CN   208031054 U   11/2018
(Continued)

OTHER PUBLICATIONS

The World Intellectual Property Organization (WIPO) International Search Report for PCT/CN2020/137759 Apr. 27, 2021 8 pages (translation included).

*Primary Examiner* — Reginald Alexander
(74) *Attorney, Agent, or Firm* — ANOVA LAW GROUP, PLLC (57) ABSTRACT

The present disclosure provides a beverage dispenser with an identification device and an operating method of the beverage dispenser. The beverage dispenser with an identification device comprises a body, the identification device installed on the body, and the heating device installed on the body and electrically connected to the identification device. It may realize the heating of the beverage in the pot via the heating device after the identification device identifies the type of pot and after the identification device turns on the (Continued)

heating device, or the disconnection of the heating device by the identification device. According to the type of pot identified, the beverage dispenser with an identification device may heat the beverage in a pot without a heat preservation function, or not heat a pot with a heat preservation function and use the pot itself for heat preservation.

6 Claims, 7 Drawing Sheets

(58) Field of Classification Search
USPC .......................................................... 99/288
See application file for complete search history.

(56) References Cited

U.S. PATENT DOCUMENTS

| | | | | |
|---|---|---|---|---|
| 8,056,468 | B2* | 11/2011 | De'Longhi | ............ A47J 31/545 |
| | | | | 99/289 P |
| 9,265,375 | B2* | 2/2016 | Knepler | ............... G06K 7/1413 |
| 2013/0284029 | A1 | 10/2013 | Reed et al. | |
| 2017/0360250 | A1* | 12/2017 | Spencer | .................. A47J 31/04 |

FOREIGN PATENT DOCUMENTS

| | | | |
|---|---|---|---|
| CN | 208973549 U | 6/2019 | |
| CN | 111870124 A | 11/2020 | |
| EP | 1808110 A1 * | 7/2007 | ............ A47J 31/057 |

* cited by examiner

BEVERAGE DISPENSER WITH AN IDENTIFICATION DEVICE AND AN OPERATING METHOD THEREOF

CROSS-REFERENCES TO RELATED APPLICATIONS

This application is a national stage application of PCT Patent Application No. PCT/CN2020/137759, filed on Dec. 18, 2020, which claims priority to Chinese Patent Application No. 202010830467.4, filed on Aug. 13, 2020, the content of all of which is incorporated herein by reference.

FIELD OF THE APPLICATION

The present disclosure relates to the field of beverage devices, in particular to a beverage dispenser with an identification device and an operating method of the beverage dispenser.

BACKGROUND

In the prior art, beverage dispensers either have an automatic heat preservation function or do not have a heat preservation function, and pots for containing beverages also either have an automatic heat preservation function or do not have a heat preservation function. Therefore, in actual use, different types of beverage dispensers often need to match the corresponding types of pots in order to realize their heat preservation function. For example, beverage dispensers with an automatic heat preservation function are generally matched with glass pots that do not have an automatic heat preservation function and are not matched with thermal pots that have an automatic heat preservation function. This results in consumers being restricted in choice when replacing the pot or the beverage dispenser; they are unable to choose different types of pots or beverage dispensers as they please, and face inconvenience in terms of use and purchase.

Therefore, there is room for the improvement and development of the prior art.

BRIEF SUMMARY OF THE DISCLOSURE

In view of the above-mentioned shortcomings of the prior art, the objective of the present disclosure is to provide a beverage dispenser with an identification device and an operating method of the beverage dispenser. Its purpose is to solve the problem related to the realization of the heat preservation function of the beverage dispenser and pot in the prior art, which concerns the inability to choose the type of pot as one pleases.

The technical solution of the present disclosure is as follows:
 a beverage dispenser with an identification device, wherein the beverage dispenser of the identification device includes a body, wherein it further comprises:
a heating device, which is installed on the body to realize the heating of the beverage in a pot by the heating device after the heating device is turned on;
an identification device, which is installed on the body and electrically connected to the heating device to realize the turning on or off of the heating device after the identification device identifies the type of the pot.
In the beverage dispenser with an identification device, the identification device comprises:
a sensor, which is used to detect the type of the pot and emit a signal corresponding to the type of the pot;
a control device, which is separately electrically connected to the sensor and the heating device, and is used to receive the signal emitted by the sensor and turn the heating device on or off according to the signal.

In the beverage dispenser with an identification device, the control device comprises:
a microcontroller chip, which is used to receive and process the signal, and is connected to electricity and to a first ground terminal;
an isolation unit, which is electrically connected to the microcontroller chip, and is used for turning the heating device on or off.

In the beverage dispenser with an identification device, the beverage dispenser with an identification device is a coffee machine.

In the beverage dispenser with an identification device, the sensor is installed on the lower middle part of the body, close to the position of the pot.

In the beverage dispenser with an identification device, the sensor includes a photosensitive sensor;
the isolation unit includes a first isolation unit;
the microcontroller chip includes a first microcontroller chip;
the first isolation unit comprises an optocoupler, a first resistor and a second resistor, wherein one end of the first resistor is connected to the first microcontroller chip, the other end of the first resistor is connected to a first pin of the optocoupler, a second pin of the optocoupler is electrically connected, a third pin of the optocoupler is connected to the second resistor, and a fourth pin of the optocoupler is connected to the second ground terminal, so as to realize the detection of light passing through the pot by the photosensitive sensor and the closing of the first isolation unit and turning on of the heating device, or conversely, the disconnection of the first isolation unit and turning off of the heating device.

In the beverage dispenser with an identification device, the sensor includes a magnetic sensor;
the isolation unit includes a second isolation unit;
the microcontroller chip includes a second microcontroller chip;
the second isolation unit comprises a magnetic proximity switch and a third resistor, of which a first pin of the magnetic proximity switch is connected to a third ground terminal, and a second pin of the magnetic proximity switch is connected to the third resistor and the second microcontroller chip, so as to realize the detection of the magnetic attraction to the pot by the magnetic sensor and the disconnection of the first isolation unit to turn off the heating device, or conversely, the closing of the first isolation unit to turn on the heating device.

An operating method of the beverage dispenser with an identification device, the method comprises:
Step 11: The photosensitive sensor detects light passing through the pot and transmits a first signal to the first microcontroller chip; otherwise, it transmits a second signal to the first microcontroller chip;
Step 12: The microcontroller chip receives the first signal and transmits the first signal to the first isolation unit after processing it, or the first microcontroller chip receives the second signal and transmits the second signal to the first isolation unit after processing it;

Step 13: The first isolation unit receives the first signal and it closes the first isolation unit, or the first isolation unit receives the second signal and it disconnects the first isolation unit;

Step 14: The first isolation unit is closed and turns on the heating device, or the first isolation unit is disconnected and turns off the heating device.

A method of the beverage dispenser with an identification device, the method comprises:

Step 21: The magnetic proximity switch detects the magnetic attraction to the pot and transmits a third signal to the second microcontroller chip; otherwise, it transmits a fourth signal to the second microcontroller chip;

Step 22: The second microcontroller chip receives the third signal and transmits the third signal to the second isolation unit after processing it, or the second microcontroller chip receives the fourth signal and transmits the fourth signal to the second isolation unit after processing it;

Step 23: The second isolation unit receives the third signal and it disconnects the second isolation unit, or the second isolation unit receives the fourth signal and it closes the second isolation unit;

Step 24: The second isolation unit is disconnected and turns off the heating device, or the second isolation unit is closed and turns on the heating device.

In the beverage dispenser with an identification device, the microcontroller chip is a microcontroller unit of model number HT66F018.

Beneficial effects: The present disclosure provides a beverage dispenser with an identification device. The beverage dispenser with an identification device comprises a body, the identification device installed on the body, and the heating device installed on the body and electrically connected to the identification device. It can realize the heating of the beverage in the pot by the heating device after the identification device identifies the type of pot and after the identification device turns on the heating device, or the disconnection of the heating device by the identification device. According to the type of pot identified, the beverage dispenser with an identification device can heat the beverage in a pot without a heat preservation function, or not heat a pot with a heat preservation function and use the pot itself for heat preservation. In this way, the same beverage dispenser can be matched with multiple types of pots, and the heat preservation effect can be achieved for all, such that the beverage dispenser with an identification device can be multifunctional and have a wider range of uses.

DETAILED DESCRIPTION

The present disclosure provides a beverage dispenser with an identification device and an operating method of the beverage dispenser. In order to make the objectives, technical solutions and effects of the present disclosure clearer and more specific, the present disclosure will be described in further detail below. It should be understood that the detailed embodiments described here are only used to explain the present disclosure, and are not used to limit the present disclosure.

Figure 1:
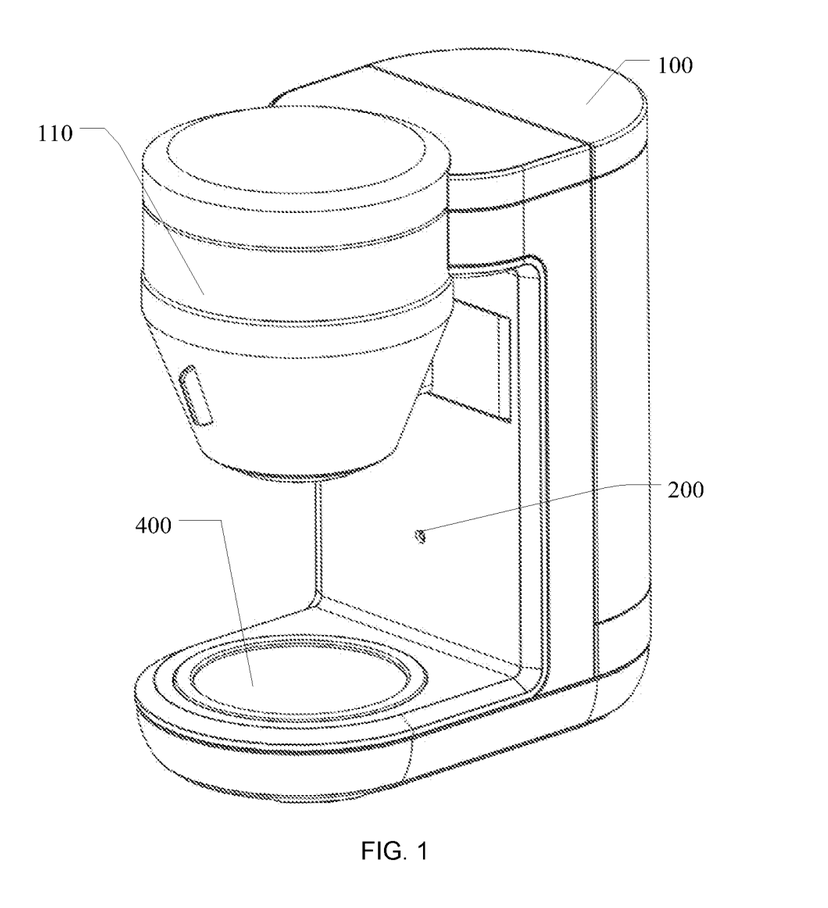
FIG. 1 illustrates a three-dimensional diagram of an embodiment of a beverage dispenser with an identification device of the present disclosure.
Figure 2:
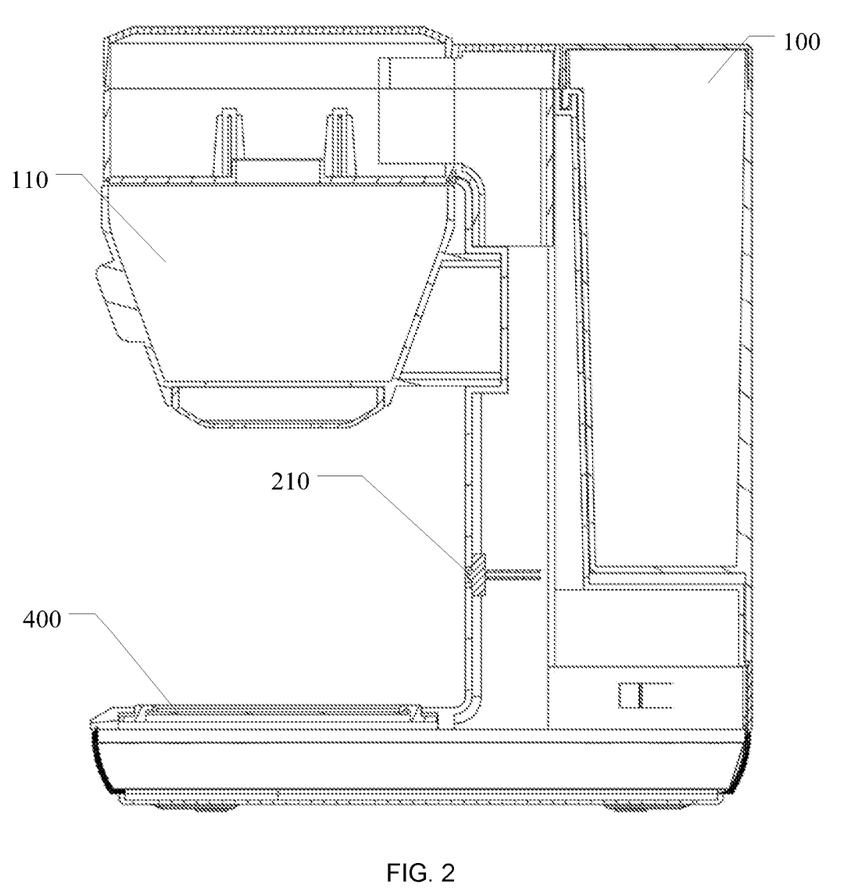
FIG. 2 illustrates a cross-sectional diagram of an embodiment of a beverage dispenser with an identification device of the present disclosure.
Figure 3:
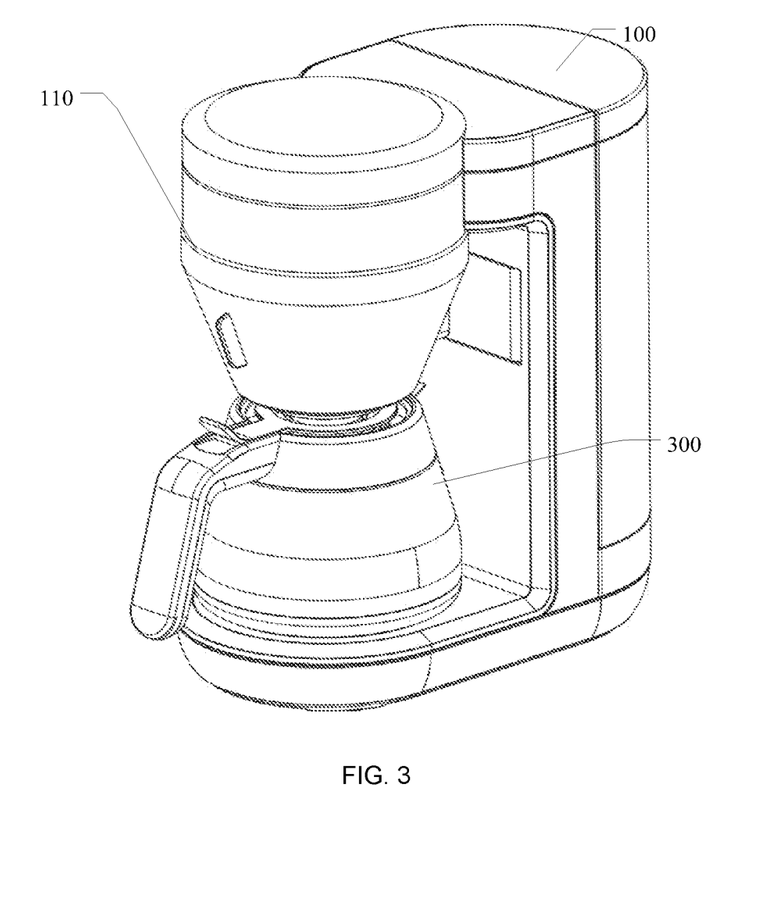
FIG. 3 illustrates a three-dimensional diagram of an embodiment of a beverage dispenser with an identification device of the present disclosure after it is fitted with a pot.

The present disclosure provides a beverage dispenser with an identification device. As shown in FIG. 1 and FIG. 3, it comprises a body 100, heating device 400 and identification device 200. The heating device 400 is installed on the body 100 and electrically connected to the body 100. The heating device 400 may be a heating device such as a heating plate. The beverage dispenser with an identification device may be a coffee machine, as shown in FIG. 2; for example, the body 100 includes a water tank, a spray, a funnel 110 and other structures. As shown in FIG. 1 and FIG. 3, the heating device 400 is situated below funnel 110 of the coffee machine. As shown in FIG. 3, a pot 300 may be placed below the funnel 110 and above the heating device 400, so that the beverage in a pot may be conveniently heated from the bottom to realize the effect of heat preservation.

Figure 4:
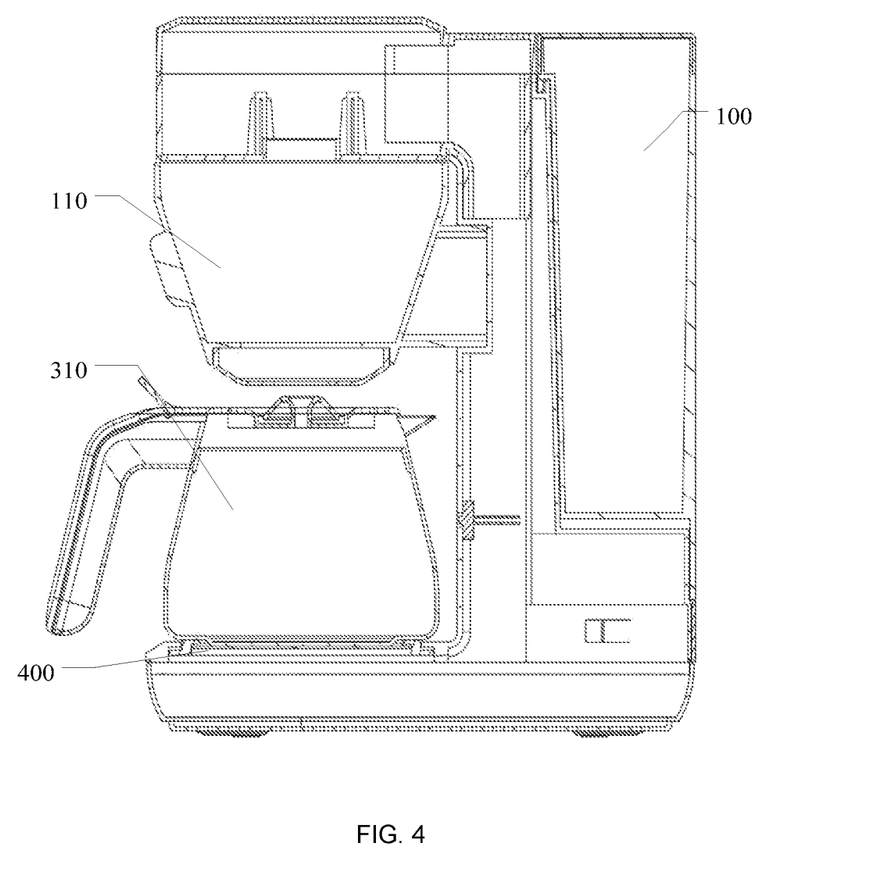
FIG. 4 illustrates a cross-sectional diagram of a preferred embodiment of a beverage dispenser with an identification device of the present disclosure fitted with a glass pot.
Figure 5:
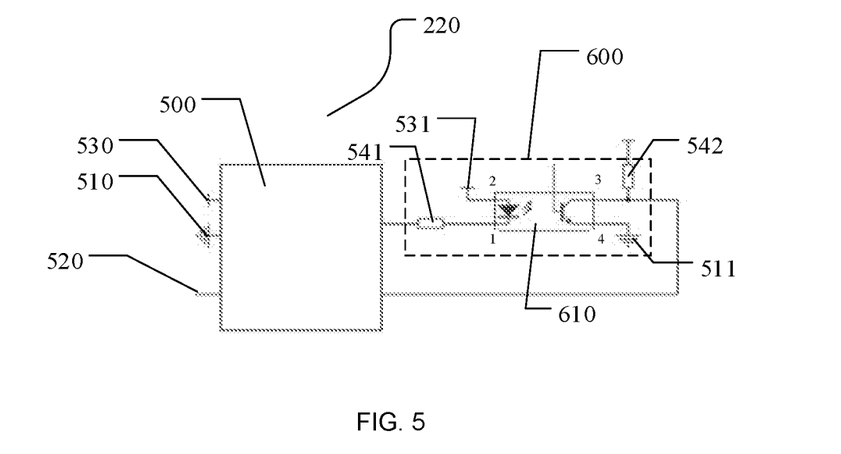
FIG. 5 illustrates a circuit diagram of the photosensitive sensor of an embodiment of a beverage dispenser with an identification device of the present disclosure.
Figure 6:
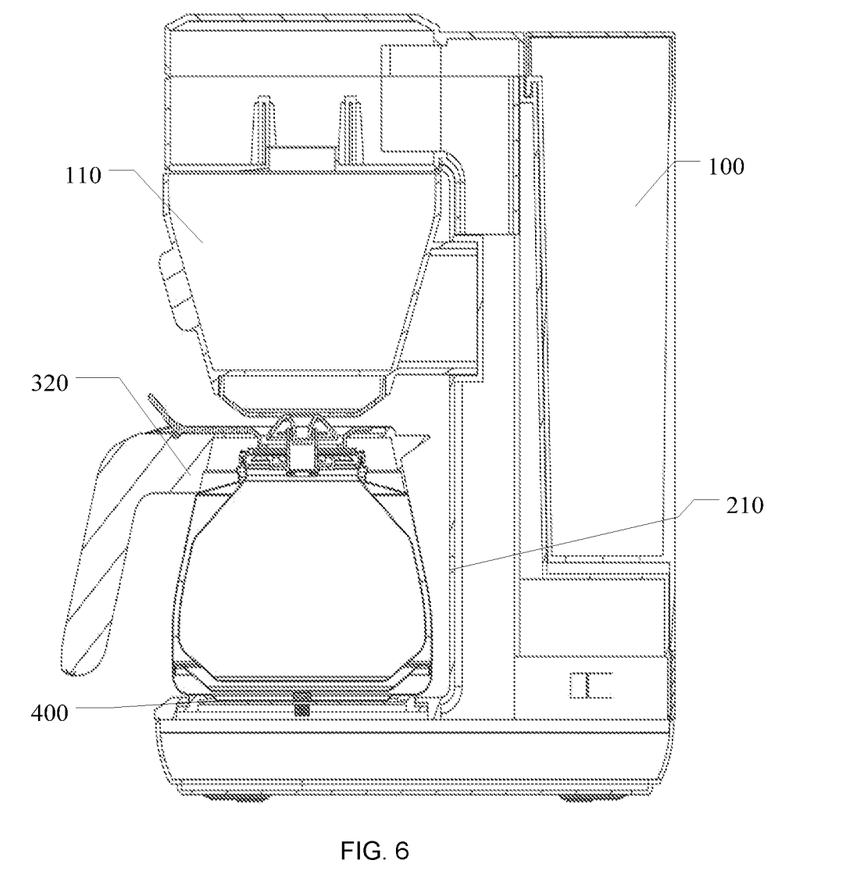
FIG. 6 illustrates a cross-sectional diagram of an embodiment of a beverage dispenser with an identification device of the present disclosure fitted with a thermal pot.
Figure 7:
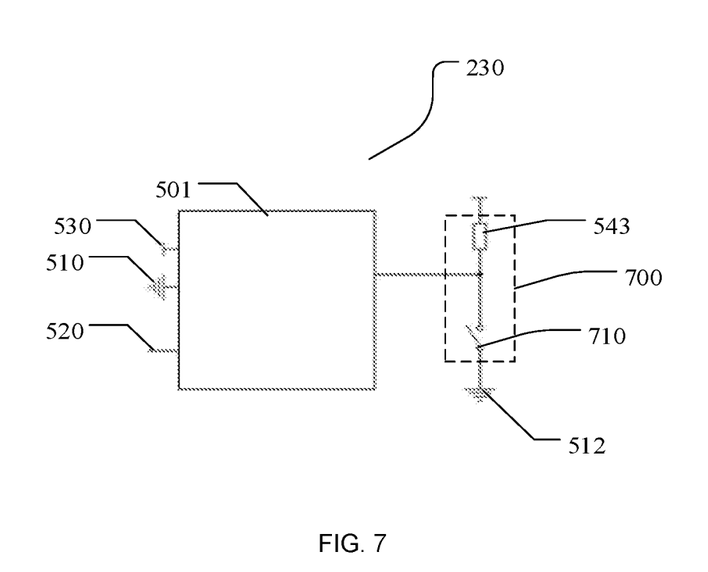
FIG. 7 illustrates a circuit diagram of the magnetic sensor of an embodiment of a beverage dispenser with an identification device of the present disclosure.

As shown in FIG. 1, the identification device 200 is installed on the body 100. Taking the coffee machine as an example, in order to facilitate the identification of a type of the pot, the identification device may be set at the position where a sensor is set in the lower middle part of the body and close to the position of the pot. Taking the example shown in FIG. 1, this would be between the funnel 110 and the heating device 400. The identification device 200 and the heating device 400 may be electrically connected. As shown in FIG. 2, FIG. 5 and FIG. 7, the identification device 200 comprises the sensor 210 and control device (the control device can be divided into a first control device 220 and a second control device 230). As shown in FIGS. 4-7, the sensor 210 is used to detect the type of the pot and transmit a signal corresponding to the type of the pot to the control device. The control device is separately electrically connected to the sensor 210 and the heating device 400. As shown in FIG. 5 and FIG. 7, the control device is used to receive the signal emitted by the sensor 210 and turn the heating device 400 on or off according to the signal. The control device comprises a microcontroller chip and an isolation unit. The microcontroller chip is used to receive and process the signal, and thereby identify the type of the pot. As shown in FIG. 5 and FIG. 7, the microcontroller chip (the microcontroller chip can be divided into a first microcontroller chip 500 and a second microcontroller chip 501) is connected to electricity 530 and to a first ground terminal 510, and it receives a signal 520. The microcontroller chip of the example is a microcontroller unit of model number HT66F018. It should be noted that microcontroller chips that may realize this function are all within the scope of protection of the present disclosure, and the type of microcontroller chip is not restricted here. The isolation unit is electrically connected to the microcontroller chip, and the isolation unit (the isolation unit can be divided into a first isolation unit 600 and a second isolation unit 700) is used to turn on or turn off the heating device 400. For example, the sensor 210 detects the type of the pot and transmits the corresponding type to the microcontroller chip, and the microcontroller chip turns on or turns off the heating device 400 after receiving the signal. In this way, one machine may be used for multiple purposes, the coffee machine may be matched with pots of various materials.

The sensor 210 of the identification device 200 may be a photosensitive sensor or a magnetic sensor. The following example is based on a photosensitive sensor. When the sensor 210 is a photosensitive sensor, as shown in FIG. 5, the control device is the first control device 220, the microcontroller chip is the first microcontroller chip 500, and the isolation unit is the first isolation unit 600. The first isolation unit 600 comprises an optocoupler 610, a first resistor 541 and a second resistor 542. One end of the first resistor 541 is connected to the first microcontroller chip, the other end of the first resistor 541 is connected to the first pin of the optocoupler 610, the second pin of the optocoupler 610 is connected to an electrical terminal 531, a third pin of the optocoupler 610 is connected to the second resistor 542, a fourth pin of the optocoupler 610 is connected to a second ground terminal 511, and the first resistor 541 is connected to the first microcontroller chip 500. When the photosensitive sensor detects light passing through the pot, the first isolation unit 600 closes and turns on the heating device 400, or conversely, the first isolation unit 600 disconnects and turns off the heating device 400. For example, as shown in FIG. 4 and FIG. 5, a glass pot 310 is placed on the heating device 400, the photosensitive sensor emits light that passes through the glass pot 310, with no reflected light or poorly reflected light, so the photosensitive device transmits a first signal to the first control device 220, of which, the first microcontroller chip 500 is connected to the first resistor 541, the first resistor 541 is connected to the first pin of the optocoupler 610, the first signal is transmitted to the optocoupler 610 and the optocoupler 610 closes, causing the heating device 400 to start working and start emitting heat, thereby realizing the heat preservation of the beverage in the glass pot 310. As shown in FIG. 6 and FIG. 7, when the thermal pot 320 is placed on the heating device 400, the photosensitive sensor emits light that cannot pass through the thermal pot 320, with reflected light or strongly reflected light, so the photosensitive sensor 210 transmits a second signal to the control device, of which, the second signal is transmitted to the optocoupler 610 and the optocoupler 610 disconnects, causing the heating device 400 to not work, thereby realizing the heating of the beverage in the pot by the heat preservation of the pot itself.

When the sensor 210 is a magnetic sensor, as shown in FIG. 7, the control device is the second control device 230, the microcontroller chip is the second microcontroller chip 501, the isolation unit is the second isolation unit 700, the second isolation unit 700 comprises the magnetic proximity switch 710 and a third resistor 543, the first pin of the magnetic proximity switch 710 is connected to a third ground terminal 512, the second pin of the magnetic proximity switch 710 is connected to the third resistor 543 and the second microcontroller chip 501, when the magnetic sensor detects the magnetic attraction to the pot, the second isolation unit 700 disconnects and turns off the heating device 400, or conversely, the second isolation unit 700 closes and turns on the heating device 400. For example, as shown in FIG. 6 and FIG. 7, when the metal thermal pot 320 is placed on the heating device 400, the magnetic sensor 210 detects the magnetic attraction to the thermal pot 320 and transmits a third signal to the second control device 230, which then transmits the signal to the magnetic proximity switch 710 and disconnects it, causing the heating device 400 to not work, and the beverage in the thermal pot 320 is thus heated by the heat preservation function of the pot itself. Here, a magnet may also be added to the pot that does not need to be heated, so as to control the body such that it is not heated.

Figure 8:
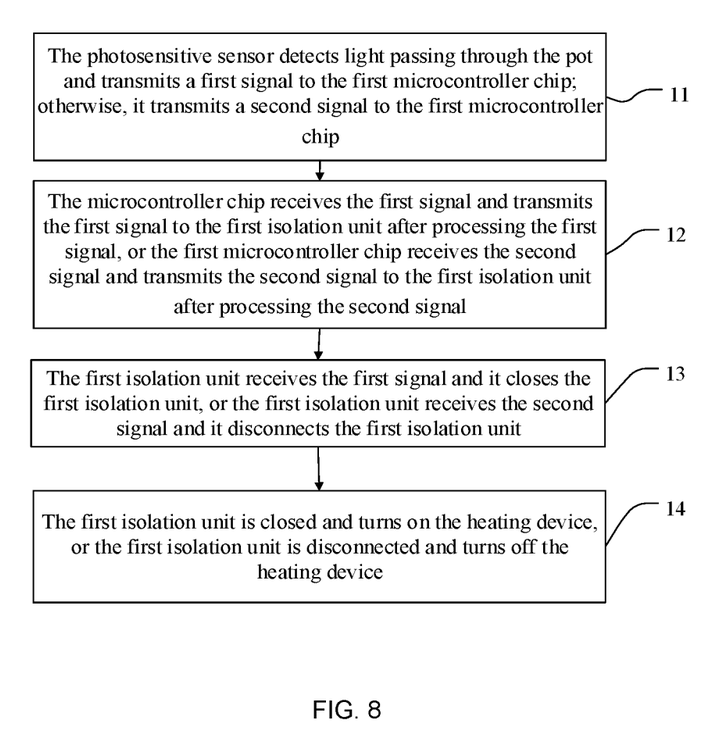
FIG. 8 illustrates a flowchart of an embodiment of the operating method of a beverage dispenser with an identification device of the present disclosure.

The present disclosure also provides an operating method of the beverage dispenser with an identification device. The operating method is based on the above-mentioned photosensitive sensor 210, as shown in FIG. 8, and the method comprises:

step 11: the photosensitive sensor 210 detects light passing through the pot and transmits a first signal to the first microcontroller chip 500, otherwise, it transmits a second signal to the first microcontroller chip 500;

step 12: the first microcontroller chip 500 receives the first signal and transmits the first signal to the first isolation unit 600 after processing it, or the first microcontroller chip 500 receives the second signal and transmits the second signal to the first isolation unit 600 after processing it;

step 13: the first isolation unit 600 receives the first signal and it closes the first isolation unit 600, or the first isolation unit 600 receives the second signal and it disconnects the first isolation unit 600;

step 14: the first isolation unit 600 is closed and turns on the heating device 400, or the first isolation unit 600 is disconnected and turns off the heating device 400.

The following example is based on a coffee machine with a photosensitive sensor. When the glass pot 310 containing coffee is placed on the heating device 400, the photosensitive sensor is located just at the upper middle position of the pot. When the photosensitive sensor senses that light can pass through the pot, or when there is less reflected light, or the reflected light is below the threshold, it transmits the first signal to the first control device 220, causing the optocoupler 610 connected to the first control device 220 to close and the heating device 400 to start emitting heat, thereby heating the coffee in the glass pot 310. When the thermal pot 320 containing coffee is placed on the heating device 400, and when the photosensitive sensor senses that light cannot pass through the pot, or when there is more reflected light, or the reflected light is above the threshold, it transmits the second signal to the first control device 220, causing the optocoupler 610 connected to the first control device 220 to disconnect and the heating device 400 to not work, and the coffee in the thermal pot 320 is thus kept warm by the thermal pot 320 itself. It should be noted that the provided method corresponds to the beverage dispenser with an identification device. The functions and technical effects correspond to each other, and they shall not be repeated here.

Figure 9:
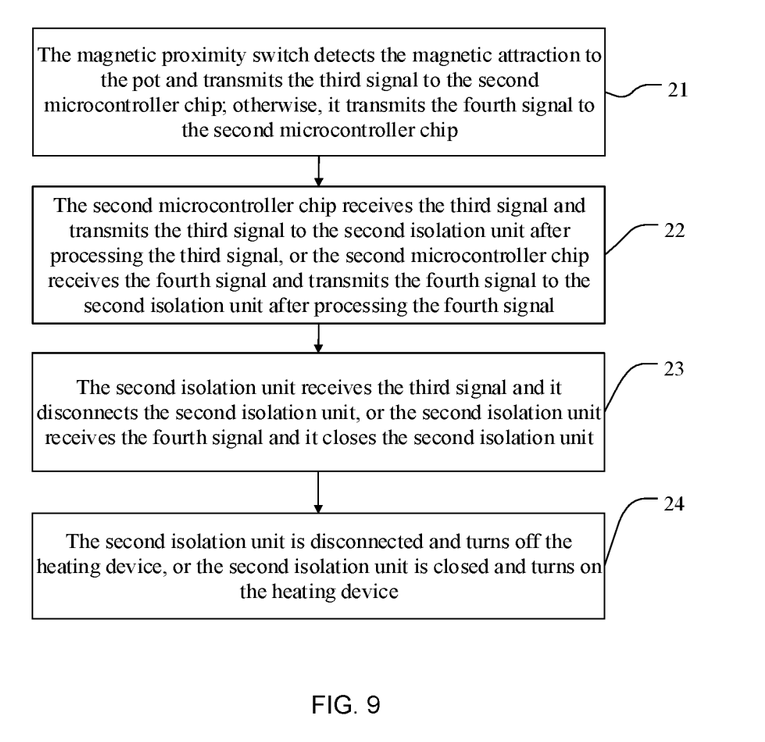
FIG. 9 illustrates a flowchart of another embodiment of the operating method of a beverage dispenser with an identification device of the present disclosure.

The present disclosure also provides another operating method of the beverage dispenser with an identification device. The operating method is based on the above-mentioned magnetic sensor, as shown in FIG. 9, and the method comprises:

step 21: the magnetic proximity switch 710 detects the magnetic attraction to the pot and transmits the third signal to the second microcontroller chip 501; otherwise, it transmits the fourth signal to the second microcontroller chip 501;

step 22: the second microcontroller chip 501 receives a third signal and transmits the third signal to the second isolation unit 700 after processing it, or the second microcontroller chip 501 receives the fourth signal and transmits the fourth signal to the second isolation unit 700 after processing it;

step 23: the second isolation unit 700 receives the third signal and it disconnects the second isolation unit 700, or the second isolation unit 700 receives the fourth signal and it closes the second isolation unit 700;

step 24: the second isolation unit 700 is disconnected and turns off the heating device 400, or the second isolation unit 700 is closed and turns on the heating device 400.

The following example is based on a coffee machine with a magnetic sensor. When the glass pot 310 containing coffee is placed on the heating device 400, the magnetic sensor is located just at the middle of the pot, which is convenient for the detection of magnetic attraction. When the magnetic sensor detects the absence of magnetic attraction to the pot, or when the magnetic attraction is lower than the threshold, it transmits the fourth signal to the second microcontroller chip 501 and the magnetic proximity switch 710 in the second isolation unit 700 that is connected to the second microcontroller chip 501 closes, causing the heating device 400 to start emitting heat, thereby heating the coffee in the glass pot 310. When the metal thermal pot 320 containing coffee is placed on the heating device 400, and when the magnetic sensor detects the magnetic attraction to the thermal pot 320 or the magnetic attraction is higher than the threshold, it transmits the third signal to the second microcontroller chip 501 and the magnetic proximity switch 710 in the second isolation unit 700 that is connected to the second microcontroller chip 501 becomes disconnected, causing the heating device 400 to not work, and the coffee in the thermal pot 320 is thus kept warm by the thermal pot 320 itself. It should be noted that the provided method corresponds to the beverage dispenser with an identification device. The functions and technical effects correspond to each other, and they shall not be repeated here.

In summary, the present disclosure provides a beverage dispenser with an identification device and an operating method of the beverage dispenser with an identification device. The beverage dispenser with an identification device may detect the type of the pot via the sensor 210. If the pot is a glass pot 310, the heating device 400 may be turned on; if the pot is a thermal pot 320, the heating device 400 may be turned off. In this way, one beverage dispenser may be matched with multiple types of pots to achieve the effect of heat preservation of the beverage, and consumers may choose the pot more freely without being restricted by the beverage dispenser. This helps to expand the use of the beverage dispenser, with more functions and a wider range of uses.

It should be understood that the application of the present disclosure is not limited to the above-mentioned examples. Those of ordinary skill in the art can make improvements or changes based on the above description, and all these improvements and changes shall fall within the scope of protection of the appended claims of the present disclosure.

What is claimed is:

1. A beverage dispenser having an identification device, the beverage dispenser comprising:
   a body;
   a heating device, which is installed on the body to realize a heating of the beverage in a pot by the heating device after the heating device is turned on;
   the identification device, which is installed on the body and electrically connected to the heating device to realize the turning on or off of the heating device after the identification device identifies a type of the pot,
   wherein the identification device comprises:
     a sensor, configured to detect the type of the pot and emit a signal corresponding to the type of the pot, the sensor comprising a photosensitive sensor;
     a control device, separately electrically connected to the sensor and the heating device, and configured to receive the signal emitted by the sensor and turn the heating device on or off according to the signal, the control device comprising:
       a microcontroller chip, which is configured to receive and process the signal, connected to electricity and to a first ground terminal, and comprises a first microcontroller chip;
       an isolation unit, which is electrically connected to the microcontroller chip, configured to turn the heating device on or off, and comprises a first isolation unit,
     wherein the first isolation unit comprises an optocoupler, a first resistor and a second resistor, wherein one end of the first resistor is connected to the first microcontroller chip, the other end of the first resistor is connected to a first pin of the optocoupler, a second pin of the optocoupler is electrically connected, a third pin of the optocoupler is connected to the second resistor, and a fourth pin of the optocoupler is connected to a second ground terminal, so as to realize detection of light passing through the pot by the photosensitive sensor, a closing of the first isolation unit and turning on of the heating device, and to realize, conversely, a disconnection of the first isolation unit and turning off of the heating device.

2. The beverage dispenser with an identification device according to claim 1, wherein the beverage dispenser with an identification device is a coffee machine.

3. The beverage dispenser with an identification device according to claim 1, wherein the sensor is installed on a lower middle part of the body, close to a position of the pot.

4. The beverage dispenser with an identification device according to claim 1, wherein,
   the sensor comprises a magnetic sensor;
   the isolation unit comprises a second isolation unit;
   the microcontroller chip comprises a second microcontroller chip;
   the second isolation unit comprises a magnetic proximity switch and a third resistor, of which a first pin of the magnetic proximity switch is connected to a third ground terminal, and a second pin of the magnetic proximity switch is connected to the third resistor and the second microcontroller chip, so as to realize the detection of the magnetic attraction to the pot by the magnetic sensor and the disconnection of the first isolation unit to turn off the heating device, or conversely, the closing of the first isolation unit to turn on the heating device.

5. An operating method of the beverage dispenser with an identification device according to claim 1, wherein comprising:
   the photosensitive sensor detecting light passing through the pot and transmitting a first signal to the first microcontroller chip; otherwise, transmitting a second signal to the first microcontroller chip;

the microcontroller chip receiving the first signal and transmitting the first signal to the first isolation unit after processing the first signal, or the first microcontroller chip receiving the second signal and transmitting the second signal to the first isolation unit after processing the second signal;

the first isolation unit receiving the first signal and closing the first isolation unit, or the first isolation unit receiving the second signal and disconnecting the first isolation unit;

closing the first isolation unit and turning on the heating device, or disconnecting the first isolation unit and turning off the heating device.

6. A method of using the beverage dispenser with an identification device according to claim 4, wherein comprising:

the magnetic proximity switch detecting the magnetic attraction to the pot and transmitting a third signal to the second microcontroller chip; otherwise, transmitting a fourth signal to the second microcontroller chip;

the second microcontroller chip receiving the third signal and transmitting the third signal to the second isolation unit after processing the third signal, or the second microcontroller chip receiving the fourth signal and transmitting the fourth signal to the second isolation unit after processing the fourth signal;

the second isolation unit receiving the third signal and disconnecting the second isolation unit, or the second isolation unit receiving the fourth signal and closing the second isolation unit;

disconnecting the second isolation unit and turning off the heating device, or closing the second isolation unit and turning on the heating device.

\* \* \* \* \*